United States Patent
Bailey et al.

(10) Patent No.: US 8,155,947 B2
(45) Date of Patent: Apr. 10, 2012

(54) MULTILINGUAL TRANSLATION SYSTEM USING CHARACTER SET

(75) Inventors: Kenneth S Bailey, Newport Beach, CA (US); Christopher Carmichael, Laguna Niguel, CA (US)

(73) Assignee: Ubiquity Broadcasting Corporation, Irvine, CA (US)

( * ) Notice: Subject to any disclaimer, the term of this patent is extended or adjusted under 35 U.S.C. 154(b) by 1165 days.

(21) Appl. No.: 11/947,648

(22) Filed: Nov. 29, 2007

(65) Prior Publication Data

US 2008/0140383 A1    Jun. 12, 2008

Related U.S. Application Data

(60) Provisional application No. 60/861,651, filed on Nov. 29, 2006.

(51) Int. Cl.
*G06F 17/20* (2006.01)
*G10L 11/00* (2006.01)
*G06F 17/27* (2006.01)
*G10L 21/00* (2006.01)

(52) U.S. Cl. ............... 704/8; 704/9; 704/270; 704/277

(58) Field of Classification Search ............... 704/8, 9, 704/270
See application file for complete search history.

(56) References Cited

U.S. PATENT DOCUMENTS

| | | | | |
|---|---|---|---|---|
| 5,952,942 | A * | 9/1999 | Balakrishnan et al. | 341/20 |
| 6,111,572 | A * | 8/2000 | Blair et al. | 715/703 |
| 6,192,332 | B1 * | 2/2001 | Golding | 704/2 |
| 7,401,016 | B2 * | 7/2008 | Masuichi et al. | 704/10 |
| 2004/0078193 | A1 * | 4/2004 | Masuichi et al. | 704/9 |
| 2004/0102957 | A1 * | 5/2004 | Levin | 704/3 |
| 2005/0017954 | A1 * | 1/2005 | Kay et al. | 345/169 |
| 2005/0267738 | A1 * | 12/2005 | Wilkinson et al. | 704/9 |

* cited by examiner

*Primary Examiner* — Justin Rider
(74) *Attorney, Agent, or Firm* — Law Office of Scott C. Harris, Inc.

(57) ABSTRACT

A system of communicating over cellular telephones using symbols in place of language parts. The symbols are downloaded as part of the lookup table. A user can enter a message in text, and that message is converted into the symbols. The symbols can then be sent to a different interactive device, which can read those symbols, and convert them into text in a different language. The user sees the symbols and begins to learn meanings of the symbols. In addition, the symbols are language independent.

11 Claims, 2 Drawing Sheets

| *Italy* | *Spain* | *Germany* | *China* | *U.S.A.* | *Definition* |
|---|---|---|---|---|---|
| ciao | hola | hallo | 你好 | Hello | "o" |
| arrivaderci | adios | tschus | 再见 | Good Bye | ":" |
| Che su | que pasa | Was auf | 怎么了 | What's Up | "U" |
| Ok | bueno | rede | 据 | Ok | "K" |
| discorso | discurso | zustimmung | 讲座 | Talk | ⟂ |
| testo | texto | text | 文 | Text | "XX" |
| cellula | celula | zelle | 电池 | Cell | ⬡ |
| messagio | mensaje | anzeige | 电文 | Message | ◯◯ |
| sconosciuto | extrano | merkwurdig | 奇怪 | Strange | + |
| trendy | De moda | trendy | 时尚 | Cool-Hip | ☆ |
| scuola | escuela | schule | 学校 | School | ▭ |
| monster | monstuo | monster | 怪物 | Monster | ⊶ |
| gioco | juego | spiel | 游戏 | Game | ⇨ |

*FIG. 1*

MULTILINGUAL TRANSLATION SYSTEM USING CHARACTER SET

This application claims priority from provisional application No. 60/861,651, filed Nov. 29, 2006, the disclosure of which is herein incorporated by reference.

BACKGROUND

Different people from different countries speak different languages, but often use the same hardware to communicate that language. For example, people speak Japanese over cell phones, text in Japanese over cell phones, and write e-mail over their PC. The same operations occur in English and many other languages.

Many abbreviations have evolved in text messaging. One such abbreviation is "OTS" meaning "over the shoulder" indicating that parents are watching.

Sometimes, however, these text messages mean different things in different languages. The simple letter K may mean okay, but in Spanish may mean "que" or what.

SUMMARY

The present application describes how different people in different languages can send messages using their portable devices. One aspect allows users of portable devices such as teens, to communicate with one another using a cryptic language scheme.

BRIEF DESCRIPTION OF THE DRAWINGS

In the Drawings:

FIG. 1 illustrates downloading a lookup table to an interactive device; and

DETAILED DESCRIPTION

Figure 2:
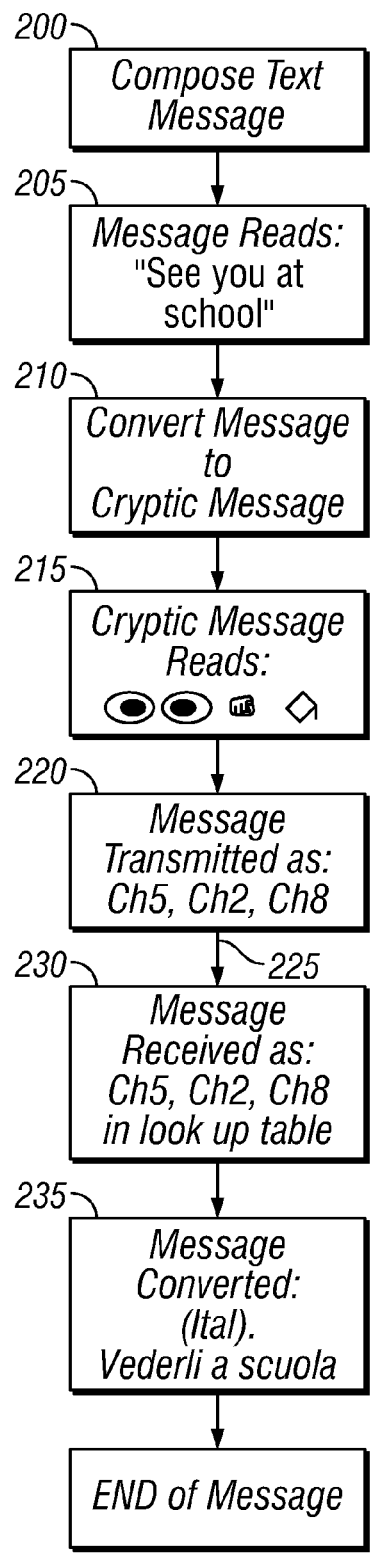
FIG. 2 illustrates a flowchart of operation of sending a text message.

An embodiment discloses the use of special kinds of text signals, referred to herein as cryptic text signals. These text signals are defined by a lookup table that can be changed at times, and can be downloaded into a user's cellular telephone or other interactive device. The messages are defined by symbols that can be text message from one cellular phone to another cellular phone regardless of the language or dialect. Each of the symbols are international symbols that have the same meaning in all languages.

In an embodiment, the table 100 includes a number of words, and their international definition. The table 100 is shown with meanings in a number of different languages, but it should be understood that the table could be for a single language. The words, such as the word hello 101 in English, has a universal symbol such as 102 that represents the meaning of the word. That universal symbol 102 represents the word in each and every language.

In the embodiment, the table 100 can be downloaded via an information link 110 to an interactive device 120 such as a cellular phone. The table can be downloaded via a PC, a website, Bluetooth link, WiFi link, Wimax link, or other equivalent link to a cellular phone 120. A cellular phone may run a WAP application that allows using these character sets. The lookup table 100 may be limited to common phrases and common words that are used to communicate over the Internet. For example, the system may be tied to the most common words used in text messages, such as age sex pet movie actor food and the like. FIG. 1 shows these words including hello—goodbye what's up okay etc. Once the person has a basic familiarity with whom vocabulary and implementation, messages can be created.

In an embodiment, a message is composed at 200 as a text message. In the embodiment, the message may read in text form "see you at school" 205. 210 uses the lookup table to convert that message to a cryptic message using the symbols 102. In this embodiment, the cryptic message is shown as 215. The message is then converted to characters at 220. However, the cryptic message is also shown to the user, so that the user can begin to recognize the meanings of these characters shown in 215. For example, the eyes in 215 means "see you" and the other things in 215 mean "at school".

The message transmitted by 220 is transmitted over a channel 225, and received at 230. The message received is then looked up in a lookup table. Since the message received is in a language-independent format, the message can be converted to any desired language. For example, here the message has been converted to Italian. However, this cryptic message once converted in this way, can be converted into any desired language.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other items can be downloadable in this way.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method, comprising:

at a first interactive device associated with a person who speaks a first language, and where said first interactive device is adapted for use by users who are speaking a first language, determining most common words used in text messages, composing a message in a limited language where said limited language is formed by plural different symbols which form the vocabulary of the limited language and where said limited language is formed from said symbols, said symbols representing said most common words used in text messages, and only symbols representing said most common words are included in the limited language, and wherein each symbol represents a specific concept;

sending a group of said symbols as a message to a remote user who has a second interactive device, where said second interactive device is adapted for use by users who are speaking a second language different than the first language in a form where at the remote user, the symbols can be converted into said second language to display the message in the second language based on said symbols.

2. A method as in claim 1, wherein said first interactive device includes a lookup table representing a relationship between specified words and specified symbols.

3. A method as in claim 2, further comprising downloading said lookup table.

4. A method as in claim 2, wherein said lookup table includes a plurality of different languages therein.

5. A method as in claim 2, further comprising, at said first interactive device, entering the message in said first language, and using said lookup table to convert the message into said limited language set.

6. A method as in claim 5, further comprising converting the text message to said symbols in said limited language and displaying the symbols.

7. A system, comprising:

an interactive device, running an operating system, and storing a lookup table, said interactive device operating to convert between specified text words and symbols indicative of said words, said interactive device allowing entry of text indicative of a message, converting said text into said symbols with one symbol representing each word and sending multiple of said symbols as a message representing said text, said interactive device also allowing receiving said symbols, and converting said symbols into text representing said symbols, wherein said lookup table stores only most common words used in text messages, and allows said sending and receiving using only said most common words.

8. A system as in claim 7, further comprising allowing said interactive device to download said lookup table, and to use a downloaded lookup table to convert between said words and said symbols.

9. A system as in claim 7, wherein said lookup table includes words in a plurality of different languages, and allows converting said symbol into any of said languages.

10. A method, comprising:

inputting a text message into a first cellular phone in a first language;

converting said text message into a first format;

sending the message in the first format over a cellular network to a second cellular phone;

receiving a message in the first format on said first cellular phone, converting said text message from said first format into a second language different than the first language; and displaying the text message in the second language to a user of the first cellular phone wherein said first format is a symbol based format based on a lookup table representing a relationship between specified words and specified symbols, further comprising downloading said lookup table, and wherein said lookup table stores only most common words used in text messages, and allows said sending and receiving using only said most common words.

11. A method as in claim 10, wherein said lookup table includes a plurality of different languages therein.

* * * * *